D. L. LEWIS.
ROD COUPLING.
APPLICATION FILED JULY 15, 1918.
1,331,776.
Patented Feb. 24, 1920.
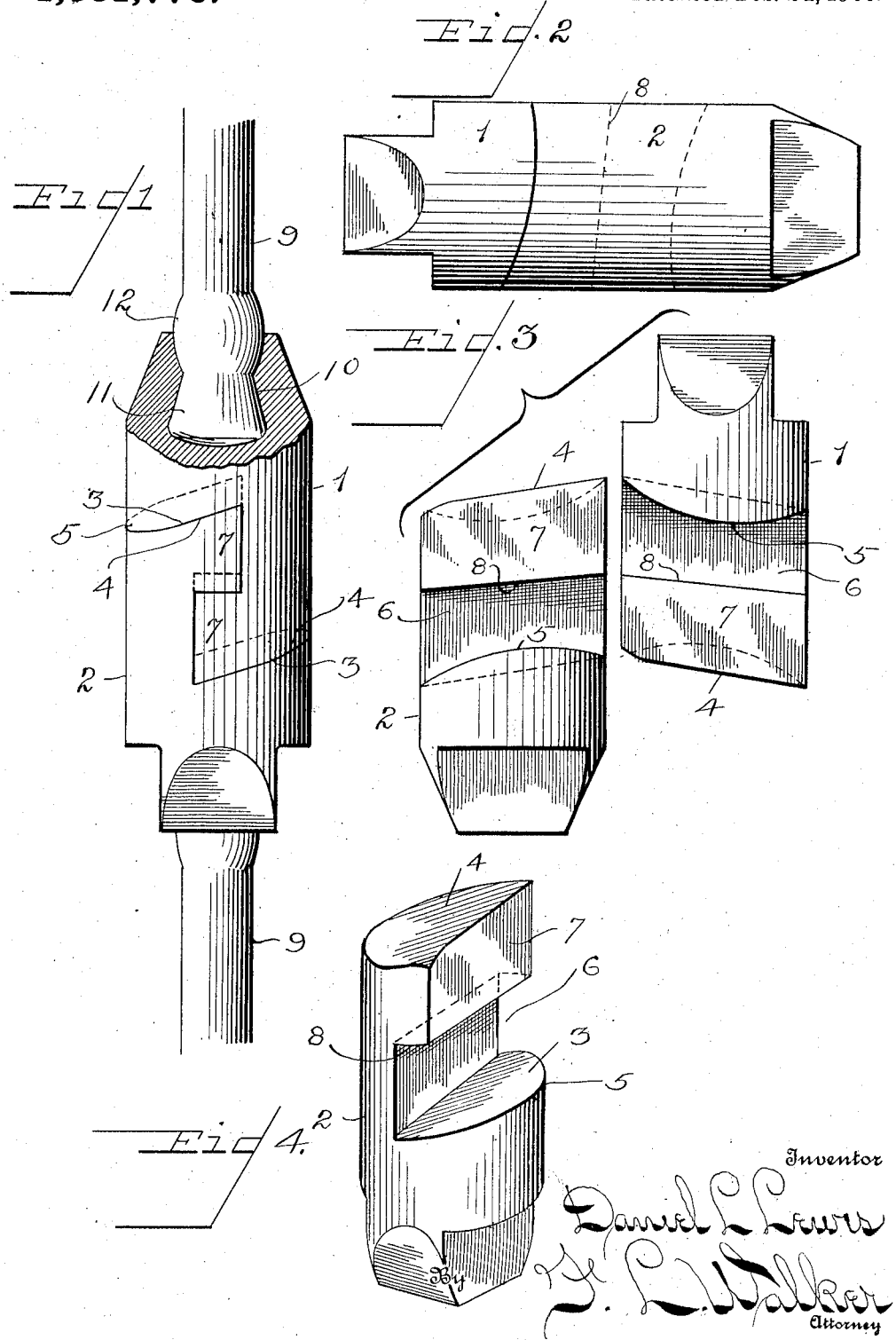
Inventor
Daniel L. Lewis
By J. L. Walker
Attorney

UNITED STATES PATENT OFFICE.

DANIEL L. LEWIS, OF DAYTON, OHIO.

ROD-COUPLING.

1,331,776. Specification of Letters Patent. Patented Feb. 24, 1920.

Application filed July 15, 1918. Serial No. 244,879.

*To all whom it may concern:*

Be it known that I, DANIEL L. LEWIS, a citizen of the United States, residing at Dayton, in the county of Montgomery and State of Ohio, have invented certain new and useful Improvements in Rod-Couplings, of which the following is a specification.

My invention relates to rod joints or splices, particularly adapted for joining sections of sucker rods and drill rods for oil wells, Artesian wells or other deep well operations, and also for push rods for sewer and conduit work, or like purposes.

The object of the invention is to simplify the structure as well as the means and mode of operation of such devices whereby they will not only be cheapened in construction, but will be more efficient in use, easily and quickly connected and disconnected, of maximum strength adapted to automatically take up lost motion or play in the joint, and unlikely to get out of repair.

A further object of the invention is to provide an interlocking joint which will maintain its interengagement under varying degrees of both tension and compression strains as well as torsional strains without the necessity of additional fastening or retaining means.

I am aware that sucker rod joints of the halved type, also joints involving dove tailed or under cut features and those embodying tapered or wedge shaped tongues are not unknown in the art. However, in most instances such constructions have relied upon retaining collars, sleeves, pins, bolts, or other additional fastening means to maintain the joint members in adjusted relation. In the construction hereinafter described, these features have been so rearranged, combined and correlated that they co-act under stress and strain to cause the joint members to more tightly and firmly engage by drawing the tapered tongue deeper into its tapered socket, the tendency of the joint being to tighten rather than to loosen, thereby permitting the said additional retaining means to be omitted.

A further object is to provide an improved means for mounting the joint members upon the connecting rod sections to eliminate lost motion and wear.

With the above primary and other incidental objects in view as will more fully appear in the specification, the invention consists of the features of construction, the parts and combinations thereof and the mode of operation, or their equivalents, as hereinafter described and set forth in the claims.

In the accompanying drawings, Figure 1, is a side elevation, partly in section of the assembled rod joint forming the subject matter hereof. Fig. 2, is a similar invention, viewed at right angle to Fig. 1. Fig. 3 illustrates the two interlocking members disconnected one from the other, one of the members being rotated through a half turn about its longitudinal axis from position for interengagement to disclose the contiguous faces.

Fig. 4, is a detail perspective view of one of the joint members. Like parts are indicated by similar characters of reference throughout the several views. The joint members 1 and 2 are quite similar in shape and proportion but differ slightly in detail, in that the interengaging tongues and recesses are inclined in opposite directions. These members have been shown cylindrical in form although they may be polygonal in cross section if desired. The members 1 and 2 are substantially halved throughout a portion of their length, whereby they are enabled to over-lap one on the other. The shoulder or offset 3 of each member adjacent to the flattened or reduced portion of the member is beveled or inclined in two dimensions or in the direction of transverse diameters. In other words the shoulder or offset is beveled and such bevel extends diagonally or inclined to the axis of the member. The terminal face 4 of each member is similarly shaped to agree with the shoulder or offset of the opposite member, upon which the terminal end 4 abuts. The shoulder 3 thus not only forms an abutment to receive the end thrust, but its beveled shape affords a dovetail or undercut form which provides a dependent lip 5 overhanging the beveled terminal face 4, and serving to lock the members against side play or disengagement.

Formed in the contiguous faces of the overlapping members are inclined tapered recesses or grooves 6 of which the beveled shoulder 3 forms one side. It is to be noted that both sides of the recess or groove 6 are inclined in the same general transverse direction but to different degrees whereby the recesses 6 are divergent or wedge shaped. It is to be noted that the recesses converge toward the terminal face 4, whereby the narrower end of the recess is nearer the terminal face than the wider end of the groove or recess. It is this arrangement which enables the end pull or strain upon the joint to draw the tapered tongue, hereafter described, deeper into said tapered recess, and thereby more securely lock the joint.

The formation of the grooved recess adjacent to the beveled shoulder 3 affords a beveled tongue or lug 7 intermediate the recess 6 and the terminal face 4. This tongue or lug 7 is of the same size and shape as the recess 6 but being formed by the inclined or divergent recess wall 8 intermediate the parallel surfaces 3 and 4, the lug or tongue is consequently tapered in the direction opposite to that of the tapered recess. The recess wall 8 however while tapered or inclined in relation with one plane or dimension, is perpendicular to the axis of the member in the other dimension. The line of the said wall 8 bi-sects the reduced portion of the member into two equal portions of which one is the recess 6 and the other the lug or tongue 7. These portions being equal the lug or tongue of each member will fit the recess of the other member, within which it will be held against lateral disengagement by the overhanging lip 5. It is to be noted that this formation affords both tongues and grooves which are beveled or undercut on one side forming a sort of dovetail joint, and that in addition thereto the tongues and grooves are longitudinally tapered, that is to say they are wider at one end than at the other, such "longitudinally tapered" being construed as in relation with the length of the tongue or groove *per se*, and that further the general direction of the tongues and grooves is at a transverse inclination to the axis of the members, the small ends of the tongues being turned toward the main body of the carrying member and away from the engaged member. When the members are overlapped and interengaged in reverse relation, the tongues and grooves of the respective members are inclined in opposite directions with the smaller ends of the divergent or wedge shaped portions turned in such direction that the pull or strain in the direction of the axis of the interlocked members tends to draw the tongues or lugs toward the smaller or narrowest ends of the recesses, hence seating the members more firmly one in the other. This tendency of one member to automatically wedge itself in the other, affords an automatic take-up for lost motion in the connection. I am aware that constructions have been employed embodying over-lapping portions having interengaging lugs and recesses, the sides of which however were parallel and at right angles to the axis of the connection, which, therefore lacked the drawing or seating action before mentioned, and which were necessarily held in engagement by additional fastening means.

I am also aware of certain inclined connections which however were not shaped to afford the wedging or tightening action before mentioned, and of other constructions having tapered recesses, the general direction of which were at right angles to the axis of the connection or nearly so, with the sides of such recesses inclined or divergent in opposite directions in relation with said axis, whereby the tendency was for the tongue to draw out of the tapered recess when subjected to strain in line with the axis.

While the present construction embodies substantially the same elements, they have been so combined and arranged as to produce the new result of maintaining their engagement without additional fastening means, and of drawing tighter in use instead of loosening. While the connection herein described is designed particularly for longitudinal reciprocatory action, it may be utilized for connecting rotary members. In such case the overhanging or dependent lips 5 resist the torsional strains.

While the members 1 and 2 may be threaded, pinned, or otherwise connected to the sections 9 of the sucker rod or drill rod, there is shown in Fig. 1, a convenient and efficient form of attachment which does not weaken the rod or stem as does either threading or pinning.

As shown the members 1 and 2 are provided with openings or recesses 10 in their ends opposite the faces 4. These recesses are constricted throughout a medial zone forming an oppositely flaring or dumbbell shaped cavity. The end of the rod 9 being heated to high temperature and thereby rendered somewhat plastic, is introduced into the cavity 10 and is swedged therein until the end of the rod conforms to the shape of the cavity. There are thus formed upon the rod two spaced swells 11 and 12. If only the swell 11, forming an enlarged head was used, the contraction of the rod upon cooling might afford a degree of looseness or play which would induce wearing of the joined rod and joint member. However, by use of the spaced swells due to the opposite flare of the cavity, the longitudinal contraction of the rod tends to draw the swelled portions one toward the other, and so cause them to bind upon the intermediate constricted walls of the cavity.

From the above description, it will be apparent that there is thus provided a device of the character described, possessing the particular features of advantage before enumerated as desirable, but which obviously is susceptible of modification in its form, proportions, detail construction or arrangement of parts without departing from the principle involved or sacrificing any of its advantages.

While in order to comply with the statute, the invention has been described in language more or less specific as to certain structural features, it is to be understood that the invention is not limited to the specific details shown, but that the means and construction herein described comprise but one mode of putting the invention into effect, and the invention is therefor claimed in any of its possible forms or modifications within the legitimate and valid scope of the appended claims.

Having thus described my invention, I claim:

1. An interlocking connection of the character described, comprising two complementary overlapping members abutting one upon the other, the overlapping faces of both members being recessed, the said recesses being somewhat divergent or tapered and transversely arranged in relation with the axis of the members, the divergent sides of the recess being inclined in the same direction in relation with the axis of the connection, and correspondingly tapered inclined lugs upon the overlapping faces of the respective members, the lug upon one member engaging in the recess of the opposing member.

2. An interlocking connection of the character described, comprising two complementary members and a tongue on each member arranged transversely to the axis thereof, each member also having therein a transversely arranged groove to receive the tongue of the complementary member, the tongue and groove being divergent or tapered in relation one with the other, both sides of the tongue and recess being furthermore transversely inclined in the same direction in relation with the axis of the connection.

3. An interlocking connection of the character described, comprising two overlapping complementary shouldered members abutting one upon the other, the abutting terminal faces and shoulders of which are inclined to the axis of the connection in two angular directions, and interengaging shoulders on the overlapping portions of the said members intermediate the abutment faces, said intermediate shoulders being inclined to the axis of the connection in the same direction but to different degree from said abutting faces.

4. An interlocking connection of the character described, comprising two complementary overlapping members having longitudinally tapered recesses in the contiguous overlapping faces inclined to the axes of the members in a plane common with the longitudinal taper of said recesses, and a like tapered and inclined lug upon each member for engagement in the said recess of the opposing member.

5. An interlocking connection of the character described, comprising two complementary overlapping members, a substantially halved joint between said members characterized by a longitudinally tapered interlocking tongue and groove connection in the contiguous faces of each of said halved members transversely inclined to the axis of the connection whereby a pulling strain will tend to draw the tapered tongue deeper into the tapered recess of such interlocking connection.

6. An interlocking connection of the halved joint type characterized by an interengaging tongue and grooved connection in each of the contiguous faces of the joint, the opposite walls or faces of the tongue and groove both being tapered or divergent in relation one with the other and both inclined in the same direction in relation with the axis of the connection, said recesses being somewhat dovetailed or undercut, and the tongues correspondingly shaped, substantially as specified.

7. An interlocking connection including, overlapping members, an interengaging tongue and groove connection in the overlapping portions of said members, the tongue carried by one of said members being longitudinally tapered and arranged transversely to the axis of said members and at an inclination thereto with its smaller end directed toward the main body of the carrying member and away from the main body of the engaged member, the groove in the engaged member being shaped and arranged in agreement with said tongue, whereby the separating strain upon said members in line with the axis thereof will tend to wedge the tapered tongue deeper into groove.

8. An interlocking connection including overlapping members, an interengaging tongue and groove connection in the overlapping faces of said members, said tongue and groove being beveled or undercut to form a dovetail joint, and in addition thereto being tapered in a longitudinal plane of said members whereby they are wider at one end than at the other end, the general direction of said tongue and groove being further inclined to the axis of said members in a longitudinal plane thereof.

In testimony whereof I have hereunto set my hand this 12th day of July A. D. 1918.

DANIEL L. LEWIS.

Witnesses:
ROBERT E. COWDEN,
FRANK L. WALKER.